US012715497B2

(12) United States Patent
Strecker et al.

(10) Patent No.: US 12,715,497 B2
(45) Date of Patent: Aug. 25, 2026

(54) APPARATUS AND METHOD OF COMPENSATING AN OSCILLATION IN A STEERING SYSTEM WITHOUT A MECHANICAL CONNECTION BETWEEN THE CONTROL UNIT AND THE STEERED WHEELS

(71) Applicant: Robert Bosch GmbH, Stuttgart (DE)

(72) Inventors: Joerg Strecker, Schwaebisch Gmuend—Grossdein (DE); Martin Pfeil, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/910,276

(22) Filed: Oct. 9, 2024

(65) Prior Publication Data

US 2025/0121878 A1 Apr. 17, 2025

(30) Foreign Application Priority Data

Oct. 12, 2023 (DE) ..................... 10 2023 209 988.8

(51) Int. Cl.
*B62D 5/04* (2006.01)

(52) U.S. Cl.
CPC .................................. *B62D 5/0472* (2013.01)

(58) Field of Classification Search
CPC ..... B62D 5/0472; B62D 5/0463; B62D 6/008
See application file for complete search history.

(56) References Cited

U.S. PATENT DOCUMENTS

2022/0177027 A1* 6/2022 Miyoshi .............. B62D 5/0472

* cited by examiner

*Primary Examiner* — Long T Tran
*Assistant Examiner* — Charles J Brauch
(74) *Attorney, Agent, or Firm* — Maginot, Moore & Beck LLP

(57) ABSTRACT

A method is for compensating an oscillation in a steering system of a vehicle without a mechanical connection between a control unit of the steering system and the steered wheels. A speed of the vehicle is determined. As a function of the speed, an estimated frequency and an estimated bandwidth of the oscillation are determined. A signal characterizing an estimated or measured force or an estimated or measured torque on a toothed rod or tie rod of the steering system is estimated. The oscillation in the signal is compensated as a function of the estimated frequency and the estimated bandwidth.

9 Claims, 3 Drawing Sheets

100
118
118
102
106
130
132
120
128
104
116
114
126
112
108
118
108
118
124
122
110

APPARATUS AND METHOD OF COMPENSATING AN OSCILLATION IN A STEERING SYSTEM WITHOUT A MECHANICAL CONNECTION BETWEEN THE CONTROL UNIT AND THE STEERED WHEELS

This application claims priority under 35 U.S.C. § 119 to patent application no. DE 10 2023 209 988.8, filed on Oct. 12, 2023 in Germany, the disclosure of which is incorporated herein by reference in its entirety.

The disclosure relates to an apparatus and method of compensating an oscillation in a steering system without a mechanical connection between the control unit of the steering system and the steered wheels of the steering system, and a steering system comprising the apparatus, and a vehicle comprising the steering system.

BACKGROUND

In a steering system without a mechanical connection between the control unit of the steering system and steering wheels of the steering system, imbalances and oscillations are indirectly felt by a driver via a body path.

SUMMARY

The method, apparatus, the steering system comprising the apparatus, and the vehicle comprising the steering system according to the disclosure compensate oscillations in a steering system without a mechanical connection between the control unit of the steering system and the steered wheels of the steering system, which are attributable to imbalances and oscillations.

The method of compensating the oscillation provides that a speed of the vehicle is determined, wherein, as a function of the speed, an estimated frequency and an estimated bandwidth of the oscillation are determined, wherein a signal is determined which characterizes an estimated or measured force or torque on a toothed rod or tie rod of the steering system, and wherein the oscillation in the signal is compensated as a function of the estimated frequency and the estimated bandwidth. The frequency estimated as a function of speed and the bandwidth estimated as a function of speed represent values for a unique frequency range of a possible oscillation. Values determined for various speeds represent a frequency corridor for the possible oscillations via the speed. Depending on the vehicle and/or tire and/or chassis properties, unique frequency corridors are defined as a function of the vehicle speed.

It can be provided that the estimated frequency and/or the estimated bandwidth are determined as a function of a longitudinal acceleration, a transverse acceleration, the force, the torque, and/or a position of the brake pedal. As a result, the frequency range or the frequency corridor is additionally defined via these accelerations, the tie rod force, or the position of the brake pedal.

It can be provided that the signal is filtered with a filter, wherein a cut-off frequency of the filter is determined as a function of the estimated frequency of the oscillation and a bandwidth of the filter as a function of the estimated bandwidth of the oscillation. With the filter, a possible negative effect of the force on the steering behavior of the steering system is avoided or reduced.

For example, the signal is filtered with the filter when it is detected that the speed is greater than or equal to a threshold, in particular 50 km/h, and/or wherein the signal is not filtered with the filter when it is detected that the speed is less than or equal to a threshold, in particular 50 km/h. As a result, the filter is selectively enabled or disabled at speeds where greater impact of the force on steering behavior is expected than other speeds.

It can be provided that a frequency of the oscillation of the signal is measured or estimated, and a compensation signal is added to the signal when it is determined that the frequency of the oscillation is within a frequency range defined by the estimated bandwidth and the estimated frequency. The compensation signal prevents or reduces a possible negative effect of the force or torque on the steering behavior of the steering system, in particular a feedback to the driver.

In one example, the compensation signal is determined as a function of the frequency of the oscillation. As a result, a negative effect in the bandwidth of frequency of the oscillation is avoided.

For example, the compensation signal is determined in terms of a shift by a specified phase, in particular 180°, in relation to the oscillation of the signal.

The apparatus for compensating an oscillation in a steering system without a mechanical connection between the control unit of the steering system and the steered wheels is configured so as to carry out the method.

The steering system comprises the apparatus. The vehicle comprises the steering system.

BRIEF DESCRIPTION OF THE DRAWINGS

Further advantageous embodiments will become apparent from the following description and the drawing. The drawings show.

DETAILED DESCRIPTION

Figure 1:
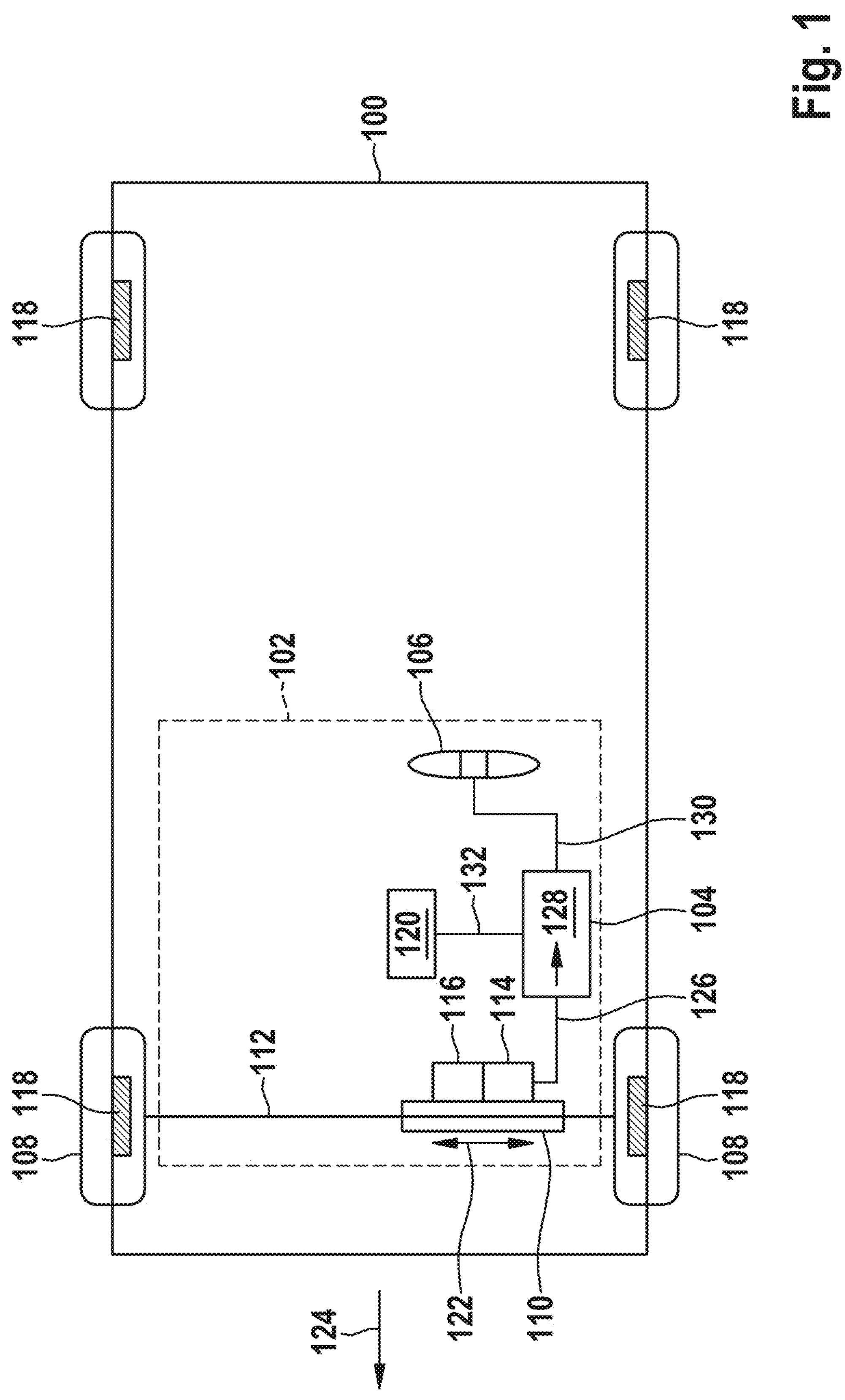
FIG. 1 a schematic illustration of a vehicle.

A vehicle 100 is shown schematically in FIG. 1.

The vehicle 100 comprises a steering system 102.

The vehicle 100 comprises an apparatus 104 for compensating an oscillation in the steering system 102.

The steering system 102 comprises a control unit 106, such as a steering wheel or joystick.

The vehicle 100 comprises steered wheels 108, in the example these are on a front axle of the vehicle 100. The rear axle can also comprise steered wheels.

The steering system 102 is a steer-by-wire steering system, i.e. the steering system 102 is without a mechanical connection between the control unit 106 and the steered wheels 108.

The steering system 102 comprises a toothed rod 110 that transmits a steering movement of the steering system 102 to the steered wheels 108 via a tie rod 112. The steering system 102 comprises a motor 114 that generates the steering movement of the steering system 102. The steering system 102 comprises a transmission 116 that transmits the steering movement from the motor 114 to the toothed rod 110.

Alternatively, the steering system 102 can be another assembly, i.e. a steering system such as a translatory or rotary single-wheel actuator. The steering system 102 can be configured so as to steer the front axle and/or the rear axle.

The vehicle 100 comprises a brake system 118 configured so as to brake the wheels of the vehicle 100. The vehicle 100 comprises a brake pedal 120 configured so as to control a braking operation via the brake system 118.

The oscillation is due, for example, to an imbalance or other interference of the respective steered wheel.

For example, the oscillation is caused by an imbalance on a wheel that is transitioning into a rotational oscillation. A cause of the imbalance can be an unbalanced wheel.

The oscillation can move at different frequency ranges, as a function of a speed 124 of the vehicle 100. A frequency calculation is as a function of a radius of the steered wheels 108 and the vehicle speed 124. For example, a frequency f of the oscillation can be calculated as a function of a circumference U of a steered wheel 108 in meters by f=v/U, wherein v indicates the speed 124 of the vehicle 100 in m/s.

For an exemplary radius, r=0.31 m, U=2 m. At the speed 124 of 120 km/h, v=33.3 m/s, and the computational frequency of the oscillation is in the range of f=17 Hz.

The oscillations can also be caused by an imbalance that occurs during the braking operation on the wheel. During the process, the brake system 118 generates a retarding force on the steered wheel, which can result in an oscillation.

The apparatus 104 is configured so as to detect a signal 126 characterizing the force 122 and to determine a signal 128 characterizing the force 122 and in which the oscillation is compensated.

The apparatus 104 is configured so as to compensate the oscillation as a function of the speed 124. The speed 124 is provided, for example, by the vehicle 100.

The apparatus 104 is configured so as to provide a feedback 130 to the control unit 106 via the force 122.

The apparatus 104 is configured so as to determine the feedback 130 as a function of the signal 128 characterizing the force 122 and in which the oscillation is compensated.

It can be provided that the apparatus 104 is configured so as to detect a position 132 of the brake pedal 120. It can be provided that the apparatus 104 is configured so as to compensate for the oscillation as a function of the position 132 of the brake pedal 120.

It can be provided that the apparatus 104 is configured so as to detect a longitudinal acceleration or transverse acceleration and compensate for the oscillation as a function of the longitudinal acceleration or transverse acceleration.

The apparatus 104 is designed so as to carry out a method for compensating the oscillation as described hereinafter.

For example, the steering system 102 is configured so as to output a feedback 130 to a driver via the control unit 106. The compensation of the oscillation results, among other things, in the feedback 130 of the steering system 102 not containing this oscillation, or only to a reduced extent.

In the example, the force 122 is considered. Consideration of a torque instead of the force 122 can be provided. The feedback 130 in the example is a force. The feedback 130 can be a torque.

Figures 2, 3:
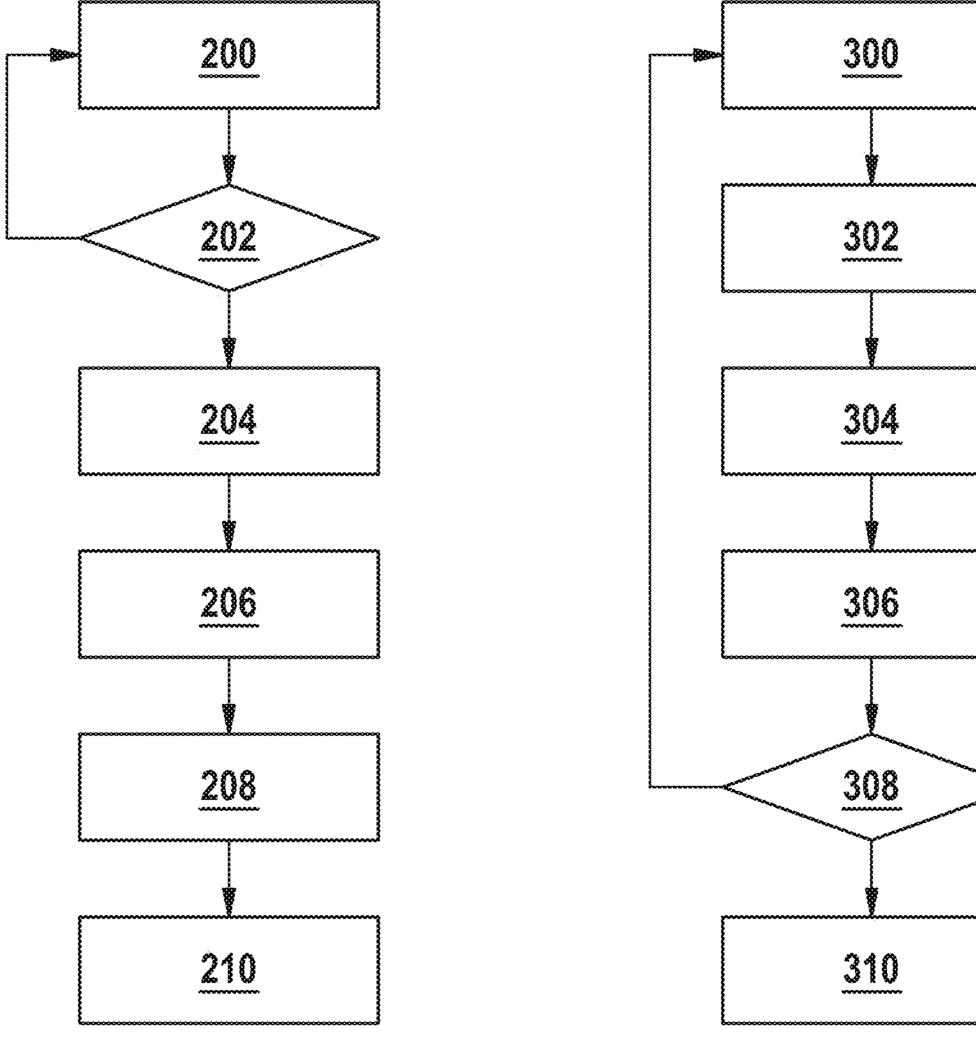
FIG. 2 a first embodiment of a method of compensating an oscillation in a steering system, FIG. 3 a second embodiment of the method of compensating the oscillation in the steering system, FIG. 4 a first embodiment of an apparatus of compensating the oscillation in the steering system, and FIG. 5 a second embodiment of the apparatus.

FIG. 2 shows a flow chart of a first embodiment of the method. According to the first embodiment of the method, the oscillation is filtered with a filter.

The method comprises a step 200.

In step 200, the speed 124 of the vehicle 100 is determined.

The method comprises a step 202.

In step 202, it is checked whether the speed 124 is greater than or equal to a threshold value. In the example, a step 204 is carried out when it is detected that the speed 124 is greater than or equal to the threshold.

The threshold value is e.g. 50 km/h.

Otherwise, step 200 is carried out. That is to say, the signal is not filtered with the filter when it is detected that the speed 124 is less than or equal to a threshold value, in particular 50 km/h.

In step 204, the signal 126 is determined, which characterizes the estimated or measured force 122 on the toothed rod 110 or tie rod 112.

The method comprises a step 206.

In step 206, an estimated frequency and an estimated bandwidth of the oscillation are determined as a function of the speed 124 of the vehicle 100.

It can be provided that the estimated frequency and/or the estimated bandwidth can be determined as a function of the longitudinal acceleration, the transverse acceleration, the force 122, and/or the position 132 of the brake pedal 120.

The method comprises a step 208.

In step 208, a cut-off frequency of the filter is determined as a function of the estimated frequency of the oscillation. In step 208, a bandwidth of the filter is determined as a function of the estimated bandwidth of the oscillation.

The method comprises a step 210.

In step 210, the oscillation in the signal 126 is compensated as a function of the estimated frequency and the estimated bandwidth.

In the example, the signal 126 is filtered with the filter.

FIG. 3 shows a flow chart of a second embodiment of the method. According to the second embodiment of the method, the oscillation is at least partially compensated.

The method comprises a step 300.

In step 300, the speed 124 of the vehicle 100 is determined.

The method comprises a step 302.

In step 302, a signal is determined, which characterizes the estimated or measured force 122 on the toothed rod 110 or tie rod 112 of the steering system 102.

The method comprises a step 304.

In step 304, an estimated frequency and an estimated bandwidth of the oscillation are determined as a function of the speed 124 of the vehicle 100.

It can be provided that the estimated frequency and/or the estimated bandwidth are determined as a function of the longitudinal acceleration, the transverse acceleration, the force 122, and/or the position 132 of the brake pedal 120.

The method comprises a step 306.

In step 306, a frequency of the oscillation of the signal 126 characterizing the force 122 is measured or estimated.

The method comprises a step 308.

In step 308, it is checked whether the frequency of the oscillation is within a frequency range defined by the estimated bandwidth and the estimated frequency.

If the frequency of the oscillation is determined to be within the frequency range defined by the estimated bandwidth and the estimated frequency, a step 310 is carried out. Otherwise, step 300 is carried out.

In step 310, the oscillation in the signal is compensated as a function of the estimated frequency and the estimated bandwidth.

In the example, a compensation signal is added to the signal 126 characterizing the force 122.

In the example, the compensation signal is determined as a function of the frequency of the oscillation.

It can be provided that the compensation signal is determined in terms of a shift by a specified phase, in particular 180°, in relation to the oscillation of the signal.

Figure 4:
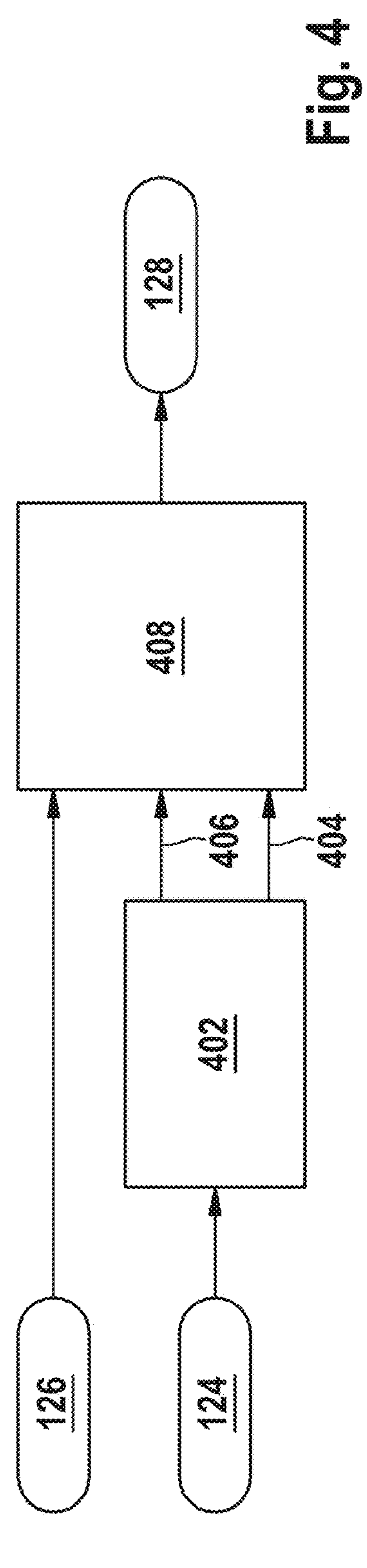

FIG. 4 shows a block diagram of a first embodiment of the apparatus 104. According to the first embodiment of the apparatus 104, there is provided an estimator 402 that estimates an estimated frequency 404 and an estimated bandwidth 406 of the oscillation as a function of the vehicle speed 124. According to the first embodiment of the apparatus, there is provided a filter 408, in particular a low-pass filter or band-pass filter, which filters the signal 126 characterizing the estimated or measured force 122 with a cut-off frequency and a bandwidth, and outputs the signal 128 characterizing the force 122 and in which the oscillation is compensated by filtering. In the example, the cut-off frequency of the filter 408 is the estimated frequency 404. The bandwidth of the filter 408 in the example is the estimated bandwidth 406.

For example, the apparatus 104 according to the first embodiment is configured so as to carry out the method according to the first embodiment.

Figure 5:
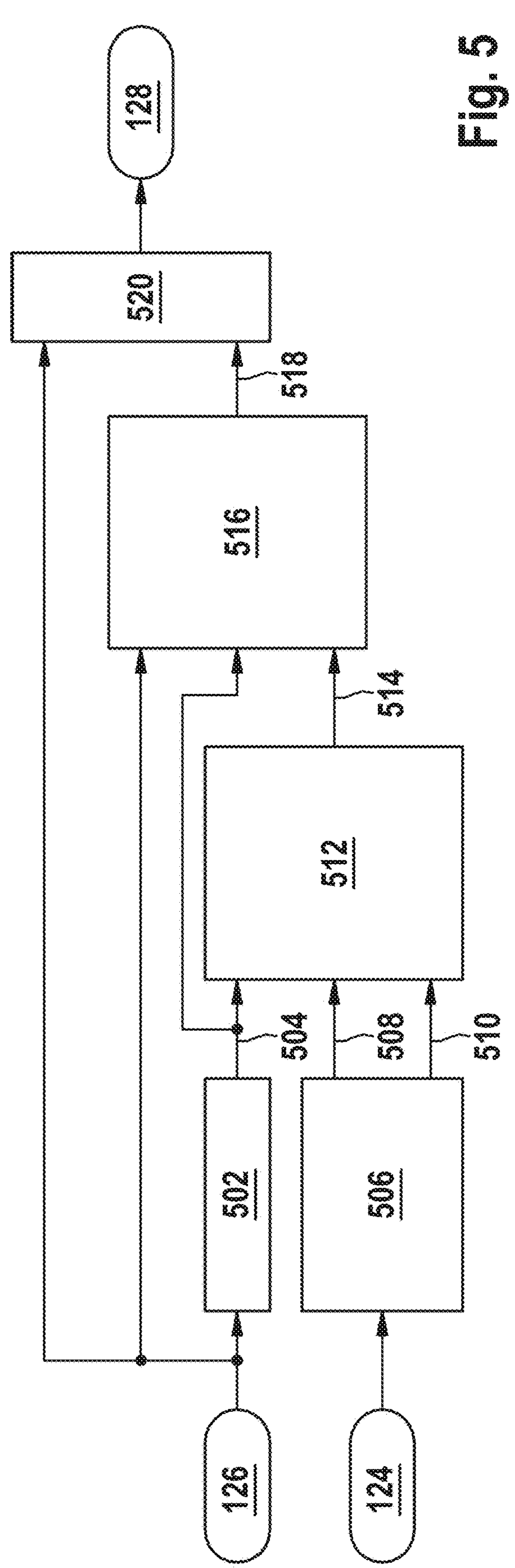

FIG. 5 shows a block diagram of a second embodiment of the apparatus 104. According to the second embodiment of the apparatus 104, the oscillation is at least partially compensated by a compensation signal.

According to the second embodiment of the apparatus 104, there is provided a first estimator 502 that estimates a measured or estimated frequency 504 of the oscillation as a function of the signal 126 characterizing the estimated or measured force 122.

According to the second embodiment of the apparatus 104, a second estimator 506 is provided, which estimates an estimated frequency 508 and an estimated bandwidth 510 of the oscillation as a function of the vehicle speed 124.

According to the second embodiment of the apparatus 104, there is provided a switch 512 that determines a signal 514 to enable or disable the compensation as a function of the measured or estimated frequency 504 and the estimated frequency 508 and the estimated bandwidth 510.

According to the second embodiment of the apparatus 104, there is provided a generator 516 configured so as to determine a compensation signal 518 as a function of the measured or estimated frequency 504 and the signal 126 characterizing the force 122. The generator 516 is configured so as to output the compensation signal 518 when the signal 514 for enabling or disabling the compensation indicates that the compensation is enabled or otherwise does not output the compensation signal 518.

In the example, the apparatus 104 according to the second embodiment comprises an adder 520, which is configured so as to add the signal 126 characterizing force 122 and the compensation signal 518 to the signal 128 characterizing force 122 and in which oscillation is compensated by the compensation signal 518. In the example, the adder 520 is configured so as to output the signal 126, which characterizes the force 122, unchanged when no compensation signal 518 is output.

For example, the apparatus 104 according to the second embodiment is configured so as to carry out the method according to the second embodiment.

It can be provided that oscillation is avoided or decreased through the compensation signal 518 and the filter 404.

For example, the estimated frequency and/or the estimated bandwidth is determined by characteristic curves or characteristic maps that specify a frequency or bandwidth as a function of the speed 124, the longitudinal acceleration, the transverse acceleration, the force 122, or the position 132 of the brake pedal 120.

What is claimed is:

1. A method of compensating an oscillation in a steering system of a vehicle without a mechanical connection between a control unit of the steering system and steered wheels of the vehicle, comprising:

determining a speed of the vehicle;

determining, as a function of the speed, an estimated frequency and an estimated bandwidth of the oscillation;

estimating a signal characterizing an estimated or measured force or an estimated or measured torque on a toothed rod or tie rod of the steering system;

compensating the oscillation in the signal as a function of the estimated frequency and the estimated bandwidth;

filtering the signal with a filter; and determining a cutoff frequency of the filter as a function of the estimated frequency of the oscillation, and determining a bandwidth of the filter as a function of the estimated bandwidth of the oscillation.

2. The method according to claim 1, wherein the estimated frequency and/or the estimated bandwidth is determined as a function of a longitudinal acceleration, a transverse acceleration, a force, a torque, and/or a position of a brake pedal.

3. The method according to claim 1, wherein:

the signal is filtered with the filter when the speed is greater than or equal to a threshold, and the signal is not filtered with the filter when the speed is less than or equal to the threshold.

4. A method of compensating an oscillation in a steering system of a vehicle without a mechanical connection between a control unit of the steering system and steered wheels of the vehicle, comprising:

determining a speed of the vehicle;

determining, as a function of the speed, an estimated frequency and an estimated bandwidth of the oscillation;

estimating a signal characterizing an estimated or measured force or an estimated or measured torque on a toothed rod or tie rod of the steering system;

compensating the oscillation in the signal as a function of the estimated frequency and the estimated bandwidth;

measuring or estimating a frequency of the oscillation of the signal; and adding a compensation signal to the signal when the frequency of the oscillation is within a frequency range defined by the estimated bandwidth and the estimated frequency.

5. The method according to claim 4, wherein the compensation signal is determined as a function of the frequency of the oscillation.

6. The method according to claim 4, wherein the compensation signal is determined in terms of a shift in relation to the oscillation of the signal by a specified phase.

7. An apparatus for compensating an oscillation in a steering system of a vehicle having steered wheels, comprising:

a control unit, wherein there is no mechanical connection between the control unit and the steered wheels, and wherein control unit is configured to carry out the method according to claim 1.

8. A steering system, comprising:

the apparatus according to claim 7.

9. A vehicle, comprising:

the steering system according to claim 8.

* * * * *